May 9, 1950 J. C. BENDER Re. 23,226

SUBSURFACE PROSPECTING DEVICE

Original Filed Feb. 18, 1936

INVENTOR
John C. Bender

BY Stevens and Davis
ATTORNEYS

Reissued May 9, 1950

Re. 23,226

UNITED STATES PATENT OFFICE 23,226

SUBSURFACE PROSPECTING DEVICE

John C. Bender, Houston, Tex., assignor, by mesne assignments, to Lane-Wells Company, Los Angeles, Calif., a corporation of Delaware Original No. 2,133,776, dated October 18, 1938, Serial No. 64,484, February 18, 1936. Application for reissue October 4, 1940, Serial No. 359,816

21 Claims. (Cl. 250—83.6)

Matter enclosed in heavy brackets [ ] appears in the original patent but forms no part of this reissue specification; matter printed in italics indicates the additions made by reissue

The invention relates to a subsurface prospecting device which may be employed to detect the location of radio-active formations and particularly where such formations have been penetrated by a well bore so that the instrument may be passed through the formation and in this manner detect the presence of the formation.

In the drilling of wells by the rotary method it is the usual practice to maintain a circulation of slush or mud in the well bore during the drilling operation in order to wall up the sides of the well bore, to exclude water, to prevent caving, to overcome formation pressures encountered, to carry away the cuttings from the drilling bit, and to cool the bit. Needless to say, with deep well bores this column of heavy mud exerts a tremendous pressure upon the formations as they are being penetrated, because the pressure of the static head of the column will approximate thousands of pounds per square inch in a deep well.

This enormous pressure forces water and mud back into the more or less porous formations, and in many instances a valuable or productive oil or gas sand may be passed unknowingly because of the fact that it has been mudded off by the drilling fluid.

Various devices have been arranged for surveying the well bore, but a majority of these are impracticable because of the fact that in many instances the well casing or pipe of steel has been or is being set in the well bore and the devices are inoperative or inaccurate when in close proximity to such a large body of metal. One class of such devices are those depending upon the magnetic properties of the formation or arrangement of the instrument.

The present invention directs itself to an instrument and method which is entirely independent of the presence of metal and the magnetic properties of the instrument, and relies upon the inherent radio-active characteristics of petroleum and its products.

It is one of the objects of the invention to provide an instrument for locating petroleum sands and other radio-active materials by detecting the location of secondary emissions from such materials.

Another object of the invention is to provide a device which may detect the presence of petroleum sands outside of a well casing in which the instrument is being operated.

Another object of the invention is to supercharge radio-active materials in an earth formation and to thereafter detect secondary emissions from such materials as an indication of the presence of a radio-active material.

Still another object of the invention is to lower into a well bore in combination a radiant energy discharge device, so as to increase the radioactivity of a radio-active material encountered.

Another object of the invention is to lower a recording apparatus into a well bore so as to detect the presence of radio-active materials by determining the [electronic] bombardment against the device when approaching a radioactive material.

Another object of the invention is to lower into a well bore a radiant energy detecting device so that the radiant energy detected can be recorded or indicated at the surface of the well bore as an indication of the presence and magnitude of a radiant energy formation.

A still further object of the invention is to energize a normally dormant radio-active material in a well bore and to then determine the extent of the formation by determining the amount of energy secondary emission therefrom.

Other and further objects of the invention will be readily apparent when the following description is considered in connection with the accompanying drawing wherein.

The earth formation generally is indicated at 2 and this formation has been penetrated by a well bore 3 and the well bore has been closed off by a metal well casing or string of pipe 4.

A radio-active formation is indicated generally at 5 and may be illustrative of a petroleum, oil, or gas sand. As previously pointed out, such productive formations as the sand 5 are very often present in the drilling operation because of the presence of mud in the well and after the casing such as 4 has been set in position it has been impossible to detect the presence of such a formation with known surveying or prospecting devices.

The present invention has a particular application to the surveying of wells which already contain a steel casing such as 4, or it may be readily applied to formations in which no casing has been set, or it may be used in any other desired manner which may be employed in detecting the presence of a radio-active formation.

Figure 1:
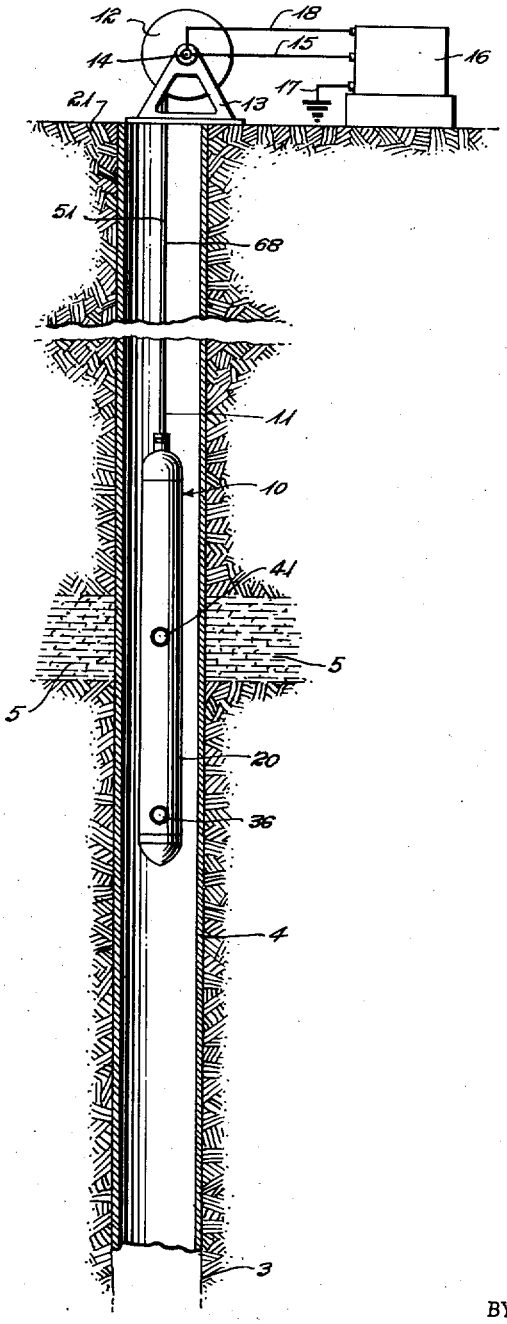
Fig. 1 is a transverse sectional view of an earth formation which has been penetrated by a well bore, and in which a radio-active formation has been covered by the well casing and which formation is to be detected by the present invention.

The instrument is illustrated generally at 10 and may be lowered or raised in the well bore by means of a cable 11. This cable is carried by a reel 12 which may be operated by any suitable power mechanism. In Fig. 1 the reel is shown as supported on a standard 13 by a shaft 14 and an electric circuit 15 is shown as being connected to the shaft 14, and it is intended that the cable 11 may extend through the shaft to this circuit 15 so that indications or recordings of the phenomena occuring in the well may be transmitted to the surface. A recording or indicating instrument is shown generally at 16 and is grounded at 17. The instrument 16 may be a cathode ray oscillograph.

Figure 2:
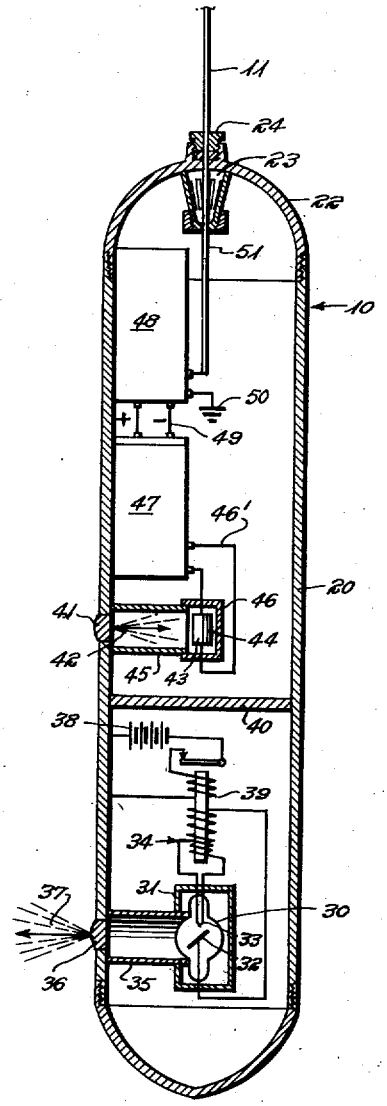
Fig. 2 is a vertical sectional view through one type of instrument which may be used for practicing the invention.

It is intended that the instrument may be incorporated in a housing such as 20 in Fig. 2, which may be formed with a lower closure cap 21 and an upper closure cap 22. Various instruments can be in this manner enclosed in a water-tight compartment. The parts of the cable 11 are shown as passing through the cap 22 to which they are anchored by the support 23 while the stuffing box or gland 24 forms a seal about the cable and prevents the entrance of foreign matter to the housing *20* [10].

In practicing the invention it is intended that the radio-active material to be detected will be super-charged or energized *so that it* [by primary radiations which may be supplied from natural substances such as radium or uranium, or from artificial sources such at X-ray tubes, whereby such material] may have sufficient activity that its presence can be determined. To supercharge or energize the formation an X-ray tube 30 has been positioned in the housing 20 and is suitably supported and shielded by a lead jacket 31. The anode 32 and the cathode 33 of this X-ray tube are energized by an electric circuit indicated generally at 34. A shield or lead cylinder 35 extends from the jacket 31 to the side of the housing 20 so that all of the radiant energy from the tube will be discharged in one direction through the cylinder 35.

A window or port 36 is provided in the wall of the housing 20 and this port may be of aluminum or other suitable material through which the primary radiations 37 of radiant energy may be discharged.

The electric circuit which energizes the X-ray tube 30 may include a battery 38 and a vibrator type high voltage transformer 39 so that the X-ray tube may be properly operated. The primary is shown as grounded to the case 20, while the high voltage secondary winding of the transformer is connected to the anode 32, and the filament secondary of the transformer is connected to the cathode. The X-ray tube and its circuit is shown in an elementary form, it being contemplated that any conventional X-ray tube and circuit capable of arrangement within the shell 20 [or other conventional source of artificial or natural radiant energy having the requisite properties,] may be employed.

A lead shield or partition 40 may be provided inside of the housing 20 so that none of the radiant energy from the tube 30 can be discharged upwardly.

When the device is lowered into the well bore the X-ray tube can be energized and there may be a constant discharge of radiant energy while the device is being lowered into the well. Whenever a radio-active material is traversed the primary radiations 37 will tend to supercharge or energize the formation such as 5 and in this manner the formation will discharge after the passage of the energizing device, a greater intensity of secondary radiations than previously when it was in a more or less dormant state.

The invention contemplates that this increased intensity of radiations may be detected and the detecting portion of the instrument is shown above the partition 40 and takes the form of a window 41 which may be made of aluminum or other material which will permit the entrance of the secondary radiations 42 as a means of indicating that a formation has been energized or supercharged by the instrument.

In order to detect the incoming secondary radiations 42 a Geiger Müller [electron] counter has been deposited in the case 20, and is indicated generally at 43. Counters of this type are well known and are not believed to require detailed explanation at this point. It may be generally stated, however, that they are capable of counting the bombardment of secondary radiations against the filament 44 as an indication of the volume of radiant energy which has been transmitted into the vicinity adjacent the counter.

In order to shield the device a lead cylinder 45 has been provided and a lead jacket 46 encloses the counter 44. The count of the secondary radiations bombardment is obtained by virtue of the circuit *46'* [46] which is connected to an amplifier 47. This amplifier is in turn operated by a battery supply source 48 by virtue of the connections 49. The battery at 48 is grounded at 50 and an electric connection is carried to the surface through the cable 51 from this instrument.

In operation, as the window 41 passes the formation 5 which has been super-charged or energized by the primary radiations 37, secondary radiations will pass through the window 41, and the intensity of these radiations may be detected by the indicator 43 and translated into electrical impulses. These impulses are received at the surface and by means of the recording or indicating device 16, in correlation with a measuring means associated with the cable 11, the location and thickness of formation giving off secondary radiations may be determined.

Also, the intensity of such secondary radiations tends to indicate the productivity of such formation. A recheck may be made by operating the device on its upward trip.

The amplifier 47 may take various forms but it has been found that when it is equipped with a General Electric Company tube type F. P. 54 that satisfactory results are obtained.

In some instances only the detector may be used and the normal radio activity of the formation detected if desired.

While the instruments for energizing the formation and for detecting the amount of energization have here been incorporated in a single instrument, it is to be understood that they may be positioned in separate casings or housings and coupled in spaced relationship if desired. Or they may be lowered into the well bore independently of each other so long as the energizing of the formation occurs in such a manner that it may be detected.

Broadly the invention contemplates a method and apparatus for detecting the presence of radio-active material in inaccessible locations.

What is claimed is:

1. An apparatus for locating substances confronting a well bore by their property of emitting secondary radiations upon being exposed to a source of primary radiations, comprising: a source of primary radiations adapted to be lowered into a well bore to impress its radiations upon said substances; and a detector of secondary radiations adapted subsequently to pass said substances.

2. An apparatus for locating substances confronting a well bore by their property of emitting secondary radiations upon being exposed to a source of primary radiations, comprising: a source of primary radiations adapted to be lowered into a well bore to impress its radiations upon said substances; a detector of secondary radiations adapted subsequently to pass said substances and translate secondary radiations therefrom into electrical impulses; means for transmitting said impulses to a point externally of the well bore; means for measuring the position of said detector; and a recorder responsive to said means for noting the position, extent and intensity of said secondary radiations.

3. An apparatus for prospecting in a cased bore hole to locate substances positioned behind the casing by means of their property of emitting secondary radiations upon being exposed to primary radiations, comprising: an emitter of casing penetrating radiations adapted to be lowered into said bore hole casing; and a detector also adapted to be lowered into said casing for absorbing secondary radiations returned from said substances through said casing.

4. An apparatus for prospecting in a cased bore hole to locate substances positioned behind the casing by means of their property of emitting secondary radiations upon being exposed to primary radiations, comprising: an emitter of casing penetrating radiations adapted to be lowered into said bore hole casing: a detector also adapted to be lowered into said casing for absorbing secondary radiations returned from said substances through said casing, said detector adapted to translate said secondary radiations into electrical impulses; means for transmitting said impulses to a point externally of the well bore; means for measuring the position of said detector; and a recorder responsive to said means for noting the position, extent and intensity of said secondary radiations.

5. A method of prospecting for substances exhibiting the property of emitting secondary radiations upon being exposed to a source of primary radiations, characterized by: passing a source of primary radiation in proximity to said substance to permit absorbing of said radiations thereby; then passing a detector of secondary radiations in similar proximity to said substances.

6. A method of prospecting for substances confronting a well bore by their property of emitting secondary radiations upon being exposed to primary radiations, characterized by: lowering a source of primary radiations into the well bore past said substances; and subsequently passing during the secondary radiating period of said substances a detector of secondary radiations.

7. A method of prospecting for substances confronting a well bore by their property of emitting secondary radiations upon being exposed to primary radiations, characterized by: lowering a source of primary radiations into the well bore past said substances; energizing the primary source while traversing said substances subsequently passing during the secondary radiating period of said substances a detector of secondary radiations in the same region previously traversed by said primary source; measuring the position of said detector; and correlating the measurement of the secondary radiations at said region with the vertical depth of said detector to determine the location, extent and quantity of such substances.

8. A method of prospecting in a cased bore hole to locate substances positioned behind the casing by means of their property of emitting secondary radiations upon being exposed to primary radiations, characterized by: discharging casing-penetrating primary radiations into said substances with substantial uniformity by a uniform movement along the casing of a source of such primary radiations; and subsequently, during the period of secondary radiations from said substances, detecting such secondary radiations from said substances as may penetrate into said casing and correlating variations of such secondary radiations with the vertical depth of their occurrence.

9. In an apparatus for investigating formation confronting a well bore wherein the ability of different formations to emit secondary radiations after being exposed to primary radiations is determined to distinguish the formations from each other: a tool entity carrying an emitter of primary radiations and a detector of secondary radiations and means shielding the detector from the emitter whereby radiations reaching said detector are principally secondary radiations returned to the well bore from the formation; means for moving said tool entity along a well bore; said detector being displaced axially from said emitter to follow the emitter past the formations treated thereby.

10. An apparatus for distinguishing between formations sealed off behind a well casing, comprising: a housing structure containing an emitter of primary radiations and detector of secondary radiations displaced axially from said emitter, and shield means minimizing direct transmission of radiations from the emitter to the detector; and means for moving said housing structure along a bore hole while the emitter and detector are in operation, and in such a manner that the detector follows past the formation treated by said emitter immediately thereafter.

11. An apparatus for distinguishing between formations sealed off behind a well casing, comprising: a housing structure containing an emitter of primary radiations and detector of secondary radiations displaced axially from said emitter, and shield means minimizing direct transmission of radiations from the emitter to the detector; means for moving said housing structure along a bore hole while the emitter and detector are in operation, and in such a manner that the detector follows past the formation treated by said emitter immediately thereafter; means for transmitting effects of said secondary radiations on said detector to the mouth of the well; and means for recording such effects in correlation with the position of the detector in the well.

12. A method of investigating formation confronting a well bore, characterized by: applying at known points along the well bore primary radiations of a character tending to induce secondary radiations from the formation back to the well bore; and immediately detecting such secondary radiations as may return.

13. A method of investigating and distinguishing formation which has been isolated by a well casing, characterized by: directing radially at known points along the well casing primary radiations of a character tending to penetrate the casing and induce secondary radiations in the formation likewise capable of penetrating the casing; and thereupon detecting such secondary radiations as may return into the well casing.

*14. In a method of surveying a borehole, the steps of lowering a radiation responsive generator of impulses continuously, of exposing the generator to the radioactive rays emanating at each level thereby altering the character of the impulses as a function of the radioactive intensity at each level, of continuously transmitting the impulses to a distant point, and there noting their characteristics, thereby obtaining a continuous indication of radioactivity while the survey is in process, the values of radioactive intensity obtained making possible their intercomparison so as to permit the differentiation between the materials at one level and those of another.*

*15. A method of obtaining geological information concerning strata existing within a deep narrow borehole comprising, measuring a radioactive property of the material comprising a stratum in situ at one locality within the borehole, similarly measuring a radioactive property of the material comprising a stratum at another locality within the borehole, the results of the first and second measurements being capable of intercomparison so as to distinguish differences in geological condition between the materials at the two localities.*

*16. An apparatus for measuring radioactive intensity within a deep narrow borehole comprising a long narrow holder and a member sensitive to radioactivity, the holder being mechanically resistant so as to protect the said member, the holder further having a substantial portion thereof relatively transparent to rays from radioactive substances, the said member being so placed relative to the transparent portion of the holder as to cause radioactive rays from substances external to the holder to act upon the said member.*

*17. An apparatus for measuring the associated radioactivity of substances lining a deep narrow borehole comprising an electrical system adapted to give a series of electrical impulses, means to alter the frequency of the impulses in proportion to the intensity of the radioactivity proximate to the said means, a relay member actuated by the said system and the said means jointly, the electrical system, means, and relay member being held by a single relatively short holder so as to minimize leakage and capacity disturbances in the portion of the circuit connecting the said means and the said relay member, the holder further having narrow lateral dimensions so as to permit its insertion in deep narrow boreholes.*

*18. An apparatus for measuring radioactivity at inaccessible locations comprising a system employing feeble electric currents, means to alter the frequency of the said feeble currents in proportion to radioactive intensity, a relay means operated by the said feeble currents, a circuit employing relatively intense currents, a conducting member, and indicating means, the feeble currents cooperating with the relay means to cause pulses of relatively intense current, the conducting member serving to convey the pulses of intense current to the indicating means, the conducting member serving further to allow placing the system employing feeble electric currents and the relay means both remote from the indicating means, the relay means and system employing feeble electric currents being placed contiguous to each other so as to minimize disturbing effects.*

*19. A process for investigating the geological formations traversed by a drill hole, which consists in quantitatively measuring the radio-active properties of the formations encountered at different depths inside the drill hole and determining the variation of the said properties with the depth of the drill hole.*

*20. The method of geophysical exploration comprising receiving in a drill hole radiations caused by radioactive processes, the said radioactions being transmitted from a limited volume of the formations located at determined depths and adjacent the said drill hole, translating the said radiations into electrical impulses, the number of the said impulses corresponding to the number of the said radiations, measuring the number of the said impulses per unit of time as an index of the strength of the said radiations, repeating said measurements for various other depths of the drill hole and comparing the resulting measurements to thereby determine the variation of the measured radiations with the depth of the drill hole as an index of the varying character of the strata traversed by the drill hole.*

*21. Apparatus adapted for use in the logging of various geological formations traversed by drill holes, including a sealed casing, an ionization chamber within the casing, the said ionization chamber being adapted to be exposed to radiations caused by radioactive transformations, the said radiations being transmitted from the formations at various depths in the drill hole, means associated with the said ionization chamber for producing an electrical current when the ionization chamber is exposed to said radiations, means for recording said current, and means for moving the said casing in the drill hole past said formations.*

JOHN C. BENDER.

REFERENCES CITED

The following references are of record in the file of this patent or the original patent:

UNITED STATES PATENTS

| Number | Name | Date |
|---|---|---|
| 893,244 | Johnston | July 14, 1908 |
| 1,589,833 | Behnken et al. | June 22, 1926 |
| 1,649,753 | Strauss et al. | Nov. 15, 1927 |
| 1,859,005 | Ricker | May 17, 1932 |
| 1,996,530 | Sundberg | Apr. 2, 1935 |
| 2,006,205 | Morgan | June 25, 1935 |
| 2,018,080 | Martienssen | Oct. 22, 1935 |
| 2,023,731 | Johnson et al. | Dec. 10, 1935 |

OTHER REFERENCES

"Zeitschrift fur Technische Physik," vol. 26, pp. 196–198 (article by J. B. Ostermeier entitled "Study on the Distribution of Radioactive Substances in Deep Bore Holes"), 1926.

"Canadian Journal of Research," vol. 11, pp. 652–657 (article by Shrum and Smith), 1934.